United States Patent
Bang

(10) Patent No.: US 10,670,715 B2
(45) Date of Patent: Jun. 2, 2020

(54) ULTRASONIC SENSOR AND CONTROL METHOD THEREOF

(71) Applicant: HYUNDAI AUTRON CO., LTD., Seongnam-si (KR)

(72) Inventor: Sung-Hoon Bang, Yongin-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/165,574

(22) Filed: Oct. 19, 2018

(65) Prior Publication Data

US 2019/0129028 A1 May 2, 2019

(30) Foreign Application Priority Data

Oct. 26, 2017 (KR) .................. 10-2017-0140371

(51) Int. Cl.
| | |
|---|---|
| G01S 15/04 | (2006.01) |
| G01S 7/527 | (2006.01) |
| G01S 15/10 | (2006.01) |
| G01S 7/539 | (2006.01) |

(52) U.S. Cl.
CPC .............. *G01S 15/04* (2013.01); *G01S 7/527* (2013.01); *G01S 7/539* (2013.01); *G01S 15/10* (2013.01)

(58) Field of Classification Search
CPC ................................. G01S 15/04; G01S 7/539
USPC ......................................................... 367/93
See application file for complete search history.

(56) References Cited

U.S. PATENT DOCUMENTS

| | | | | |
|---|---|---|---|---|
| 2006/0013070 | A1* | 1/2006 | Holm | G01S 5/0081 367/128 |
| 2008/0037799 | A1* | 2/2008 | Yarygin | H04R 1/403 381/63 |
| 2019/0011621 | A1* | 1/2019 | Karafin | G02B 6/023 |

FOREIGN PATENT DOCUMENTS

| | | |
|---|---|---|
| JP | 09 230047 A | 9/1997 |
| JP | 1997230047 A | 8/1999 |
| JP | 5520812 B2 | 6/2014 |
| KR | 10 1999 0048491 A | 7/1999 |
| KR | 10 2000 0056486 A | 9/2000 |
| KR | 10 2005 0118818 A | 12/2005 |
| KR | 10 2016 0066641 A | 6/2016 |
| KR | 10 2016 0069076 A | 6/2016 |

OTHER PUBLICATIONS

Notice of Allowance, Korea Intellectual Property Office, dated Sep. 16, 2019, Korea.

* cited by examiner

*Primary Examiner* — Fabricio R Murillo Garcia
(74) *Attorney, Agent, or Firm* — Baker & Hostetler LLP; Hyunho Park

(57) ABSTRACT

An ultrasonic sensor control method includes outputting a first sensing signal, comparing a voltage value of a first reflection signal corresponding to the first sensing signal with a predetermined reference voltage value, determining a conversion method of the first reflection signal according to a voltage value comparison result, converting the first reflection signal according to a determined conversion method, and detecting an object by comparing a converted first reflection signal with a predetermined reference reflection signal.

8 Claims, 5 Drawing Sheets

|  | SLD output | Digital Amp. Output |
|---|---|---|
| 21 — $\chi < K_1$ | $y_1 = \dfrac{\chi^2}{2K_1}$ | $z_1 = Gy_1 = G\dfrac{\chi^2}{2K_1}$ |
| $\chi \geq K_1$ | $y_1 = \chi - \dfrac{K_1}{2}$ | $z_1 = Gy_1 = G\left(\chi - \dfrac{K_1}{2}\right)$ |

|  | Digtal Amp. Output | SLD output |
|---|---|---|
| 22 — $z_2 < K_2$ | $z_2 = G\chi$ | $y_2 = \dfrac{z_2^2}{2K_2} = G^2\dfrac{\chi^2}{2K_2}$ |
| $z_2 \geq K_2$ | $z_2 = G\chi$ | $y_2 = z_2 - \dfrac{K_2}{2} = G_\chi - \dfrac{K_2}{2}$ |

FIG. 2

ULTRASONIC SENSOR AND CONTROL METHOD THEREOF

CROSS-REFERENCE TO RELATED APPLICATIONS

This application claims the priority of Korean Patent Application No. 10-2017-0140371 filed on Oct. 26, 2017, in the Korean Intellectual Property Office, the disclosure of which is hereby incorporated by reference in its entirety.

BACKGROUND

1. Technical Field

The present disclosure relates to an ultrasonic sensor and a control method thereof, and more particularly, to an ultrasonic sensor which may extend an object sensible distance and improve sensing accuracy by sectioning a measurable range, and to a control method thereof.

2. Description of the Related Art

Ultrasonic sensors are proximity sensors that transmit ultrasonic waves to an object by applying an AC voltage to a piezoelectric element constituting a transmitter and receive the ultrasonic waves reflected from the object, thereby sensing a nearby object or measuring a distance between the sensor and the object.

In detail, an ultrasonic sensor employs a piezoelectric element having piezoelectric and electrostrictive properties as a vibration source.

When a pressing or twisting force is applied to a crystal piece located between electrodes, a voltage is generated between the electrodes. Such a phenomenon is referred to as a piezoelectric effect. Reversely, when a voltage is applied to a crystal piece between the electrodes, distortion due to pressure is generated in the crystal piece. Such a phenomenon is referred to as an electrostrictive effect.

In other words, the piezoelectric element located between the electrodes may be vibrated by receiving a pressure by means of a voltage applied from the outside, and as the piezoelectric element is vibrated by the externally applied pressure, a voltage may be applied between the electrodes. Accordingly, the ultrasonic sensor uses a piezoelectric element having piezoelectric and electrostrictive properties to convert an electrical signal to a physical signal or vice versa.

For example, when electrical energy of a high frequency is applied to the piezoelectric element, fast vibration of the same number of the frequency is generated on a piezoelectric film of the piezoelectric element. In this state, when the applied frequency is over 20 kHz, the piezoelectric element may generate ultrasound waves having a particular frequency range that a human cannot hear.

An ultrasonic sensor according to the related art uses a square law detector (SLD) to improve a signal to noise ratio (SNR) in an ultrasonic signal processing process.

FIG. 1 illustrates an ultrasonic signal conversion process using a square law detector 10 and formulae used by the square law detector 10.

In signal processing, noise may be generated in an ultrasonic signal used in an ultrasonic sensor, and thus accuracy of measurement of a position of an object by the ultrasonic sensor may be reduced due to the noise. In other words, for improvement of the position measurement accuracy of the ultrasonic sensor, the noise of a reflection signal 12 that is the ultrasonic signal reflected from the object needs to be removed.

Referring to FIG. 1, as the reflection signal 12 passes the square law detector 10, the amplitude of the reflection signal 12 may decrease and simultaneously noise may be separated from the reflection signal 12. In other words, the reflection signal 12, which is used to detect an object in an ultrasonic sensor, may be removed of a noise signal through square law detection. In this state, a reflection signal 14 removed of noise may be used to detect an object through comparison with a predetermined reference signal.

A general square law detector uses a predetermined reference voltage value, and when a voltage value of an input signal is greater than the reference value, relatively decreases the voltage value of the input signal. When the voltage value of the input signal is less than the reference value, the square law detector relatively much decreases the voltage value of the input signal and simultaneously separates an original signal and a noise signal.

Referring back to FIG. 1, with respect to a predetermined reference voltage value $K_1$, when a voltage value of the input signal x is less than the reference value $K_1$, an the output signal $y_1$ may have a voltage value "$x^2/(2*K_1)$", and when the voltage value of the input signal x is greater than or equal to the reference value $K_1$, the output signal $y_1$ may have a voltage value "$x-(K_1/2)$" (16).

In other words, when the voltage value of the input signal x is less than the reference value $K_1$, the output signal $y_1$ has a reduction ratio of the voltage value much greater than the output signal $y_1$ when the voltage value of the input signal x is greater than or equal to the reference value $K_1$.

An existing ultrasonic sensor may amplify the voltage of an ultrasonic signal in the ultrasonic signal processing process to increase an object sensible distance.

A reflection signal that is reflected from an object located relatively far from the ultrasonic sensor has a voltage value that is relatively less than a reflection signal reflected from an object located relatively close to the ultrasonic sensor.

When the amplitude of the reflection signal reflected from the object is similar to the size of noise, the ultrasonic sensor may not be able to distinguish noise from the reflection signal reflected from the object.

Accordingly, the ultrasonic sensor may increase the object sensible distance by increasing a voltage value difference between the reflection signal and the noise by amplifying the voltage of the ultrasonic signal through an amplifier in the ultrasonic signal processing process.

As such, the ultrasonic sensor may remove the noise of the reflection signal reflected from the object or amplify the amplitude of the reflection signal for the improvement of position measurement accuracy and the increase of the object sensible distance.

However, it is problematic that, in the reflection signal processing process, the ultrasonic sensor generates a different signal according to an application order of the noise removing operation and the signal amplification operation.

FIG. 2 illustrates an example of output signals of the ultrasonic sensor using different signal conversion processes.

As illustrated in FIG. 2, when noise of the reflection signal is removed (SLD output) and then a reflection signal from which noise is removed is amplified according to a predetermined amplification ratio (Digital Amp. output), a signal to noise ratio may be improved because noise is previously removed. However, it is a demerit that a reduction rate of the reflection signal is not constant according to the amplification ratio used for the amplifier (21).

In contrast, when the reflection signal is amplified according to a predetermined amplification ratio (Digital Amp. output) and then noise of a converted reflection signal is removed (SLD output), the reduction rate of a reflection signal is constant and the amplitude of the signal is relatively increased. However, it is a demerit that the signal to noise ratio deteriorates because the amount of noise increases as well in the amplification process that is first performed (22).

As a result, since the improvement of position measurement accuracy and the extension of the object sensible distance of the ultrasonic sensor are contradictory, an ultrasonic sensor capable of applying the noise removing operation and the signal amplification operation used for signal processing in an appropriate order according to the current state of an object, that is, the current position and movement direction of the object, and a control method thereof, are demanded.

SUMMARY

It is an object of the present disclosure to provide an ultrasonic sensor which may control a degree of improving position measurement accuracy and extending an object sensible distance by using a signal conversion method corresponding to each of sectioned detection ranges, and a control method thereof.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an ultrasonic sensor control method includes outputting a first sensing signal, comparing a voltage value of a first reflection signal corresponding to the first sensing signal with a predetermined reference voltage value, determining a conversion method of the first reflection signal according to a voltage value comparison result, converting the first reflection signal according to a determined conversion method, and detecting an object by comparing a converted first reflection signal with a predetermined reference reflection signal.

The determining of the conversion method of the first reflection signal according to the voltage value comparison result may include, when the voltage value of the first reflection signal is less than the predetermined reference voltage value, amplifying the first reflection signal according to a predetermined amplification ratio and then removing noise of an amplified first reflection signal.

The determining of the conversion method of the first reflection signal according to the voltage value comparison result may include, when the voltage value of the first reflection signal is greater than or equal to the predetermined reference voltage value, removing noise of the first reflection signal and then amplifying a first reflection signal from which the noise is removed, according to a predetermined amplification ratio.

The method may further include receiving an input of a signal conversion method directly from a user, and converting the first reflection signal according to a received signal conversion method.

The method may further include outputting a second sensing signal, calculating an increase/decrease amount of the voltage value of the reflection signal by comparing a voltage value of a second reflection signal corresponding to the second sensing signal with the voltage value of the first reflection signal, and determining a conversion method of the second reflection signal according to the increase/decrease amount.

In accordance with another aspect of the present disclosure, an ultrasonic sensor includes a sensing signal output unit configured to output a first sensing signal, a reflection signal comparator configured to compare a voltage value of a first reflection signal corresponding to the first sensing signal with a predetermined reference voltage value, a reflection signal converter configured to determine a conversion method of the first reflection signal according to a comparison result of the voltage value, and convert the first reflection signal according to a determined conversion method, and an object detector configured to detect an object by comparing a converted first reflection signal with a predetermined reference reflection signal.

When the voltage value of the first reflection signal is less than the predetermined reference voltage value, the reflection signal converter may amplify the first reflection signal according to a predetermined amplification ratio and then remove noise of an amplified first reflection signal.

When the voltage value of the first reflection signal is greater than or equal to the predetermined reference voltage value, the reflection signal converter may remove noise of the first reflection signal and then amplify a first reflection signal from which the noise is removed, according to a predetermined amplification ratio.

The reflection signal converter may receive an input of a signal conversion method directly from a user, and convert the first reflection signal according to a received signal conversion method.

The sensing signal output unit may output a second sensing signal. The reflection signal comparator may calculate an increase/decrease amount of the voltage value of the reflection signal by comparing a voltage value of a second reflection signal corresponding to the second sensing signal with the voltage value of the first reflection signal. The reflection signal converter may determine a conversion method of the second reflection signal according to the increase/decrease amount.

BRIEF DESCRIPTION OF DRAWINGS

FIG. 2 illustrates an example of output signals of the ultrasonic sensor using different signal conversion processes.

DETAILED DESCRIPTION

Figure 1:
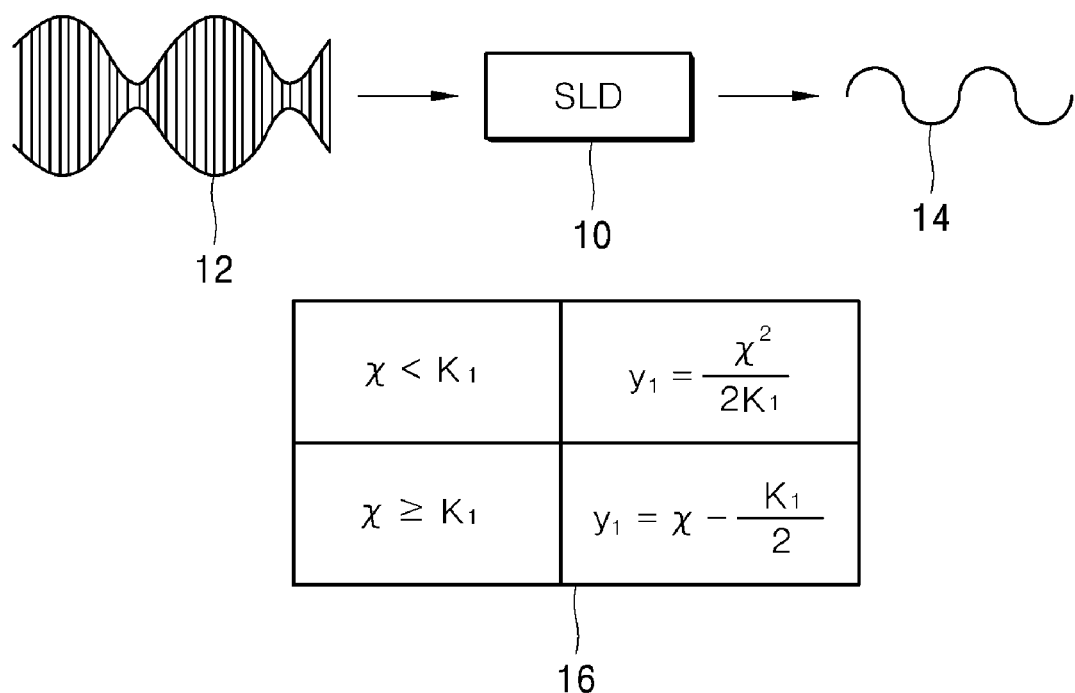
FIG. 1 illustrates an ultrasonic signal conversion process using a square law detector and formulae used by the square law detector.

The above-described purpose, characteristics, and merits will now be described more fully with reference to the accompanying drawings, in which embodiments of the disclosure are shown. In the following description, when detailed descriptions about related well-known functions or structures are determined to make the gist of the present disclosure unclear, the detailed descriptions will be omitted herein. Throughout the drawings, like reference numerals denote like elements.

Figure 3:
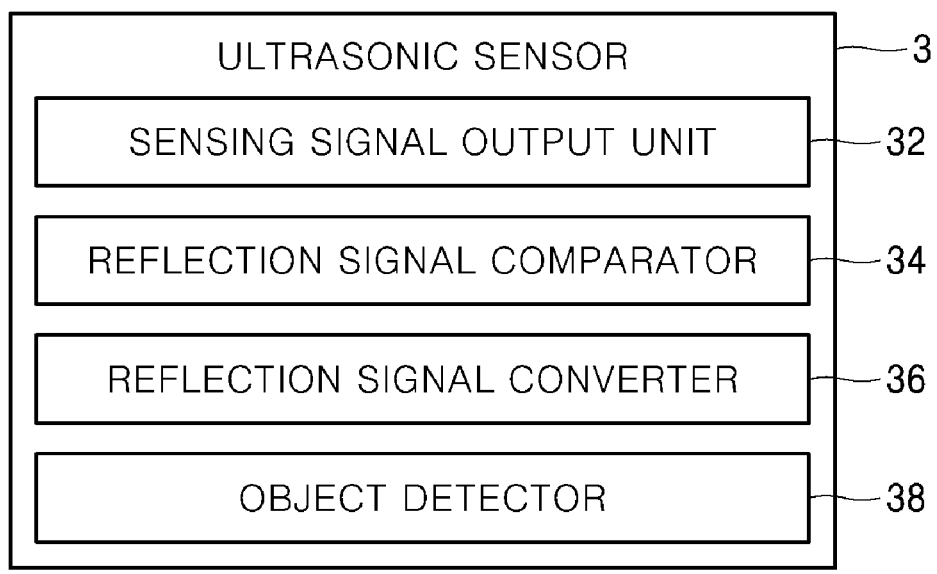
FIG. 3 is a block diagram of a schematic configuration of an ultrasonic sensor according to an embodiment.

FIG. 3 is a block diagram of a schematic configuration of an ultrasonic sensor 3 according to an embodiment.

Referring to FIG. 3, the ultrasonic sensor 3 according to the present embodiment may include a sensing signal output unit 32, a reflection signal comparator 34, a reflection signal converter 36, and an object detector 38.

The sensing signal output unit 32 outputs a first sensing signal.

In the present disclosure, the first sensing signal may signify a signal transmitted from the sensing signal output unit 32 of the ultrasonic sensor 3 to the outside. In other words, when a sensing signal output from the ultrasonic sensor 3 is reflected by an object, a reflection signal is generated due to a reflection wave, and a reflection signal generated by the first sensing signal is a first reflection signal.

In an embodiment of the present disclosure, the sensing signal output unit 32 may output a second sensing signal.

In the present disclosure, the second sensing signal may signify a sensing signal output from the sensing signal output unit 32 after the first sensing signal is output.

The ultrasonic sensor 3 may generate and transmit a sensing signal according to a predetermined cycle. In other words, a plurality of sensing signals sequentially transmitted by the ultrasonic sensor 3 are reflected from the object located at an object sensible distance, a plurality of reflection signals are generated. As the ultrasonic sensor 3 sequentially receives and analyzes the reflection signals, the existence of an object, the current position of an object, and the movement of an object may be determined.

For example, when a distance between the ultrasonic sensor 3 and the object determined based on the first reflection signal corresponding to the first sensing signal is greater than a distance between the ultrasonic sensor 3 and the object determined based on the second reflection signal corresponding to the second sensing signal, the ultrasonic sensor 3 may determined that the object is located within the object sensible distance and the object currently approaches the ultrasonic sensor 3.

The reflection signal comparator 34 compares a voltage value of the first reflection signal corresponding to the first sensing signal with a predetermined reference voltage value.

In the present disclosure, the reference voltage value may signify a voltage value used as a reference to determine a signal conversion method of the first reflection signal.

In other words, a signal conversion method of the reflection signal converter 36 to be described later is determined according to a comparison result of the voltage value of the first reflection signal with the reference voltage value by the reflection signal comparator 34.

In an embodiment of the present disclosure, the reflection signal comparator 34 may compare a voltage value of the second reflection signal corresponding to the second sensing signal with the voltage value of the first reflection signal, thereby calculating an increase/decrease amount of the voltage value of the reflection signal.

As described above, the ultrasonic sensor 3 according to the present embodiment may determine the existence of the object, the current position of the object, and the movement of the object by comparing the distance between the ultrasonic sensor 3 and the object determined based on the first reflection signal corresponding to first sensing signal with the distance between the ultrasonic sensor 3 and the object determined based on the second reflection signal corresponding to the second sensing signal.

In this state, the reflection signal comparator 34 may compare the voltage value of the second reflection signal with the voltage value of the first reflection signal to compared the distance between the ultrasonic sensor 3 and the object determined based on the first reflection signal with the distance between the ultrasonic sensor 3 and the object determined based on the second reflection signal, and simultaneously, calculate the increase/decrease amount of the voltage value of the reflection signal.

The reflection signal converter 36 may determine a conversion method of the first reflection signal according to the comparison result of the voltage value, and convert the first reflection signal according to the determined conversion method.

In an embodiment of the present disclosure, when the voltage value of the first reflection signal is less than the predetermined reference voltage value, the reflection signal converter 36 may amplify the first reflection signal according to a predetermined amplification ratio, and then remove noise of the amplified first reflection signal.

In other words, when the voltage value of the first reflection signal is less than the predetermined reference voltage value, the reflection signal converter 36 may first amplify the first reflection signal to increase the amplitude of the first reflection signal, and decrease the amplified first reflection signal at a certain reduction rate and simultaneously remove the noise included in the reflection signal.

As such, in the ultrasonic sensor 3 according to the present embodiment, when the first reflection signal has a relatively small voltage value, the amplitude of the first reflection signal is increased through the reflection signal converter 36, and thus signal conversion processing may be performed mainly for the improvement of the signal conversion processing may be performed mainly for the improvement of the object sensible distance.

In the above signal conversion method, since the reflection signal is first amplified, the object sensible distance may be improved. However, as the noise is also amplified at the same amplification ratio as that of the reflection signal in the amplification process of the reflection signal, a signal to noise ratio may deteriorate as well.

In an embodiment of the present disclosure, when the voltage value of the first reflection signal is greater than or equal to the predetermined reference voltage value, the reflection signal converter 36 may remove the noise of the first reflection signal, and then amplify the first reflection signal from which noise is removed according to the predetermined amplification ratio.

In other words, when the voltage value of the first reflection signal is greater than or equal to the predetermined reference voltage value, the reflection signal converter 36 may first reduce the first reflection signal and simultaneously remove the noise included in the reflection signal, and amplify the first reflection signal from which noise is removed to increase the amplitude of the first reflection signal.

As such, in the ultrasonic sensor 3 according to the present embodiment, when the first reflection signal has a relatively large voltage value, the noise of the first reflection signal is first removed through the reflection signal converter 36, and thus the signal conversion processing may be performed mainly for the improvement of position measurement accuracy.

In the above signal conversion method, since the noise removal is first performed, the improvement of position measurement accuracy may be possible. However, as the reduction rate of the amplitude of the reflection signal varies according to the amplification ratio of the reflection signal, the control of the amount of the voltage value of the reflection signal is impossible, and thus the object sensible distance may decrease.

In an embodiment of the present disclosure, the reflection signal converter 36 may directly receive an input of a signal conversion method from a user, and convert the first reflection signal according to the signal conversion method that is received.

In other words, the user of the ultrasonic sensor 3 according to the present embodiment may directly input a signal conversion method to the reflection signal converter 36, and the reflection signal converter 36 that receives the signal conversion method from the user may convert the first reflection signal according to the received signal conversion method, regardless of the voltage value of the reflection signal.

In an embodiment of the present disclosure, when the reflection signal comparator 34 calculates the increase/decrease amount of the voltage value of the reflection signal by comparing the voltage value of the second reflection signal corresponding to the second sensing signal with the voltage value of the first reflection signal, the reflection signal converter 36 may determine the conversion method of the second reflection signal according to the calculated voltage value increase/decrease amount.

As described above, although the reflection signal converter 36 may determine the signal conversion method by comparing the voltage value of the first reflection signal with the predetermined reference voltage value, the conversion method of the second reflection signal may be determined based on the comparison result of the voltage value of the second reflection signal and the voltage value of the first reflection signal by the reflection signal comparator 34.

In this state, the reflection signal comparator 34 may compare the voltage value of the second reflection signal with the voltage value of the first reflection signal to compare the distance between the ultrasonic sensor 3 and the object determined based on the first reflection signal with the distance between the ultrasonic sensor 3 and the object determined based on the second reflection signal, and simultaneously calculate the increase/decrease amount of the voltage value of the reflection signal.

For example, when the voltage value is determined to increase by comparing the voltage value of the second reflection signal with the voltage value of the first reflection signal reflection signal, the reflection signal comparator 34 may determine that the object moves within the object sensible distance of the ultrasonic sensor 3 and simultaneously determine that the object approaches close to the ultrasonic sensor 3.

When there is an object that approaches close to the ultrasonic sensor 3, the accurate position measurement of the object may be a more important factor to consider than the existence of the object within the object sensible distance.

Accordingly, when the reflection signal comparator 34 determines that there is an object that approaches close to the ultrasonic sensor 3, for the accurate position measurement of the object, the reflection signal converter 36 may first remove the noise of the first reflection signal, regardless of the voltage value of the reflection signal, and then amplify the first reflection signal from which noise is removed, according to the predetermined amplification ratio.

In contrast, when the voltage value of the reflection signal is determined to be decreased by comparing the voltage value of the second reflection signal with the voltage value of the first reflection signal, the reflection signal comparator 34 may determine that the object is moving within the object sensible distance of the ultrasonic sensor 3 and simultaneously determine that object moves away from the ultrasonic sensor 3.

When the object moves away from the ultrasonic sensor 3 as above, the existence of the object within the object sensible distance may be a more important factor to consider than the accurate position measurement of the object.

Accordingly, when the reflection signal comparator 34 determines that the object moves away from the ultrasonic sensor 3, to determine the existence of the object within the object sensible distance, the reflection signal converter 36 may first amplify the first reflection signal according to the predetermined amplification ratio, regardless of the voltage value of the reflection signal, and then remove the noise of the amplified first reflection signal.

The object detector 38 detects the object by comparing the converted first reflection signal with a predetermined reference reflection signal. In the present disclosure, the predetermined reference reflection signal is a reference for determining the existence of the object within a measurable distance.

Figure 4:
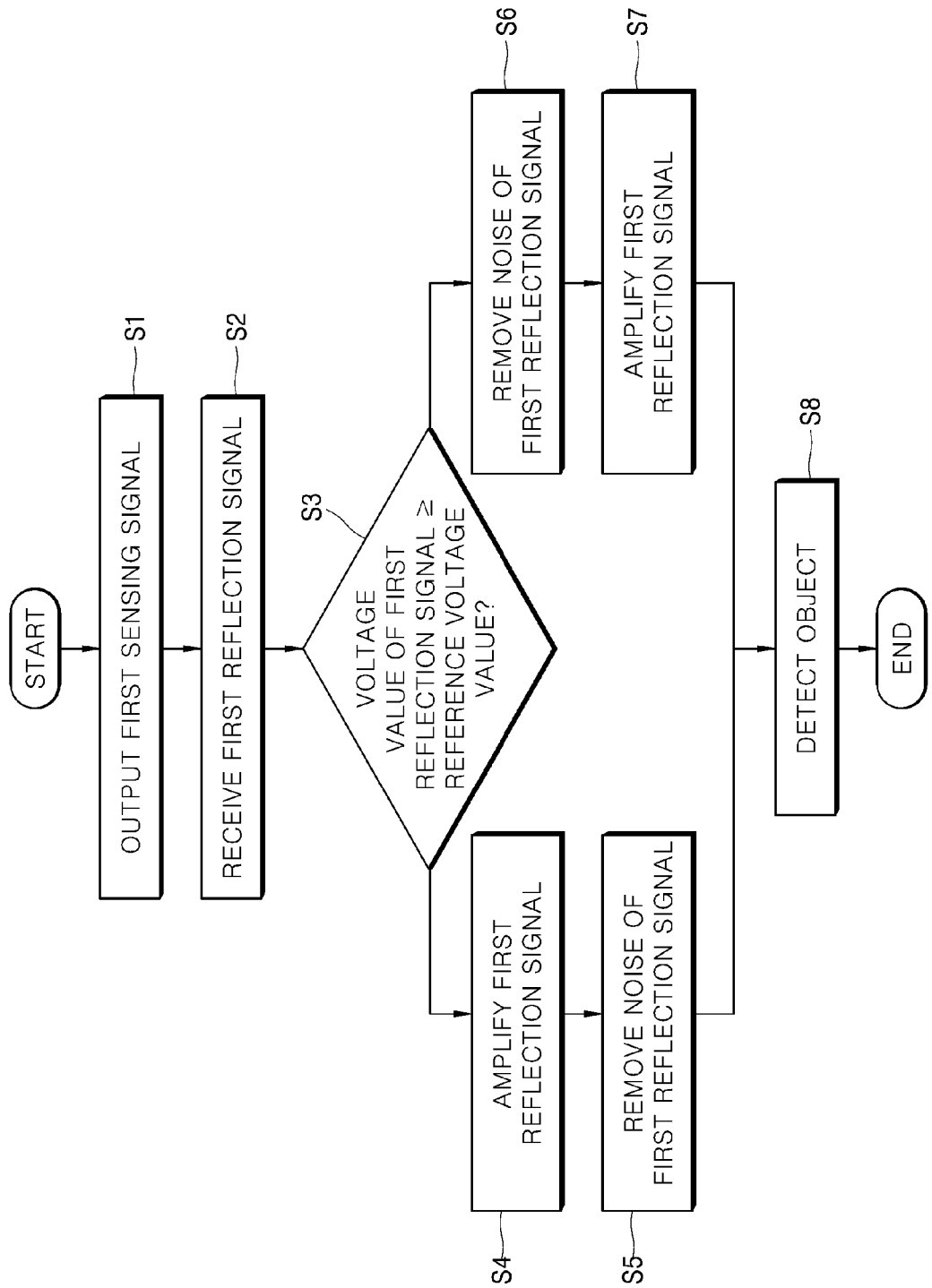
FIG. 4 is a flowchart of a method of controlling an ultrasonic sensor according to an embodiment.

FIG. 4 is a flowchart of a method of controlling an ultrasonic sensor according to an embodiment.

Referring to FIG. 4, first, the sensing signal output unit 32 outputs a first sensing signal (S1).

Next, when a first reflection signal generated as the first sensing signal is reflected from an object is received (S2), the reflection signal comparator 34 compares a voltage value of the first reflection signal corresponding to the first sensing signal with a predetermined reference voltage value.

In other words, the reflection signal comparator 34 determines whether the voltage value of the first reflection signal corresponding to the first sensing signal is greater than or equal to the predetermined reference voltage value (S3).

As a result of the determination (S3), when the voltage value of the first reflection signal is less than the predetermined reference voltage value, the reflection signal converter 36 may amplify the first reflection signal according to a predetermined amplification ratio (S4), and then remove noise of an amplified first reflection signal (S5).

In other words, when the voltage value of the first reflection signal is less than the predetermined reference voltage value, the reflection signal converter 36 may increase the amplitude of the first reflection signal by amplifying the first reflection signal, and decrease the amplified first reflection signal at a certain reduction rate and simultaneously remove the noise included in the first reflection signal.

As described above, when the first reflection signal has a relatively small voltage value, the ultrasonic sensor 3 according to the present embodiment first increase the amplitude of the first reflection signal through the reflection signal converter 36, and thus the signal conversion processing may be performed mainly for the improvement of the object sensible distance.

As such, since the signal conversion method first performs amplification of the reflection signal, the object sensible distance may be improved. However, since in the amplification process of the reflection signal noise is amplified as well at the same amplification ratio as that of the reflection signal, a signal to noise ratio may deteriorate as well.

As a result of the determination (S3), when the voltage value of the first reflection signal is greater than or equal to the predetermined reference voltage value, the reflection signal converter 36 may remove the noise of the first reflection signal (S6) and then amplify the first reflection signal from which noise is removed, according to the predetermined amplification ratio (S7).

In other words, when the voltage value of the first reflection signal is greater than or equal to the predetermined reference voltage value, the reflection signal converter 36 may first decrease the first reflection signal and simultaneously remove the noise included in the reflection signal, and thus increase the amplitude of the first reflection signal by amplifying the first reflection signal from which noise is removed.

As described above, when the first reflection signal has a relatively large voltage value, the ultrasonic sensor 3 according to the present embodiment may first remove the noise of the first reflection signal through the reflection signal converter 36, and thus the signal conversion processing may be performed mainly for the improvement of position measurement accuracy.

As such, since in the signal conversion method the removal of noise is first performed, the improvement of position measurement accuracy may be possible. However, as the reduction rate of the reflection signal varies according to the amplification ratio of the reflection signal, the control of the amount of the voltage value of the reflection signal is impossible, and thus the object sensible distance may decrease.

Finally, the object detector 38 detects the object by comparing the converted first reflection signal with the predetermined reference reflection signal (S8).

Although not illustrated in FIG. 4, the reflection signal converter 36 of the present embodiment may directly receive a signal conversion method from the user at any stage of the signal conversion process.

In other words, the user of the ultrasonic sensor 3 according to the present embodiment may directly input a signal conversion method to the reflection signal converter 36. The reflection signal converter 36 that receives the signal conversion method from the user may convert the first reflection signal according to the inputted signal conversion method, regardless of the voltage value of the reflection signal.

Although not illustrated in FIG. 4, the sensing signal output unit 32 may output a second sensing signal after outputting a first sensing signal.

In this state, the reflection signal comparator 34 may compare the voltage value of the second reflection signal corresponding to the second sensing signal with the voltage value of the first reflection signal and calculate the increase/decrease amount of the voltage value of the reflection signal.

When the reflection signal comparator 34 calculates the increase/decrease amount of the voltage value of the reflection signal, the reflection signal converter 36 may determine the conversion method of the second reflection signal according to the calculated increase/decrease amount of the voltage value of the reflection signal.

As described above, although the reflection signal converter 36 may determine the signal conversion method by comparing the voltage value of the first reflection signal with the predetermined reference voltage value, the signal conversion method may be determined based on the comparison result of the voltage value of the second reflection signal and the voltage value of the first reflection signal by the reflection signal comparator 34.

When the reflection signal voltage value is determined to be increased by comparing the voltage value of the second reflection signal with the voltage value of the first reflection signal, the reflection signal comparator 34 may determine that the object is moving within the object sensible distance of the ultrasonic sensor 3 and simultaneously determine that the object approaches close to the ultrasonic sensor 3.

When there is the object that approaches close to the ultrasonic sensor 3, since the accurate position measurement of the object may be a more important factor to consider than the existence of the object within the object sensible distance, the reflection signal converter 36 may first remove the noise of the first reflection signal for the accurate position measurement of the object, regardless of the voltage value of the reflection signal, and then amplify the first reflection signal from which noise is removed, according to the predetermined amplification ratio.

Reversely, when the reflection signal voltage value is determined to be decreased by comparing the voltage value of the second reflection signal with the voltage value of the first reflection signal, the reflection signal comparator 34 may determine that the object is moving within the object sensible distance of the ultrasonic sensor 3 and simultaneously determine that the object moves away from the ultrasonic sensor 3.

When the object moves away from the ultrasonic sensor 3 as above, since the existence of the object within the object sensible distance may be a more important factor to consider than the accurate position measurement of the object, the reflection signal converter 36 may first amplify the first reflection signal according to the predetermined amplification ratio, regardless of the voltage value of the reflection signal, to determine the existence of the object within the object sensible distance, and then remove the noise of the amplified first reflection signal.

As described above, in the ultrasonic sensor according to the present embodiment, since a signal conversion method is employed corresponding to an appropriate detection range sectioned according to the predetermined reference voltage value, a degree of the improvement of position measurement accuracy and the extension of the object sensible distance may be appropriately controlled depending on the situation.

Figure 5:
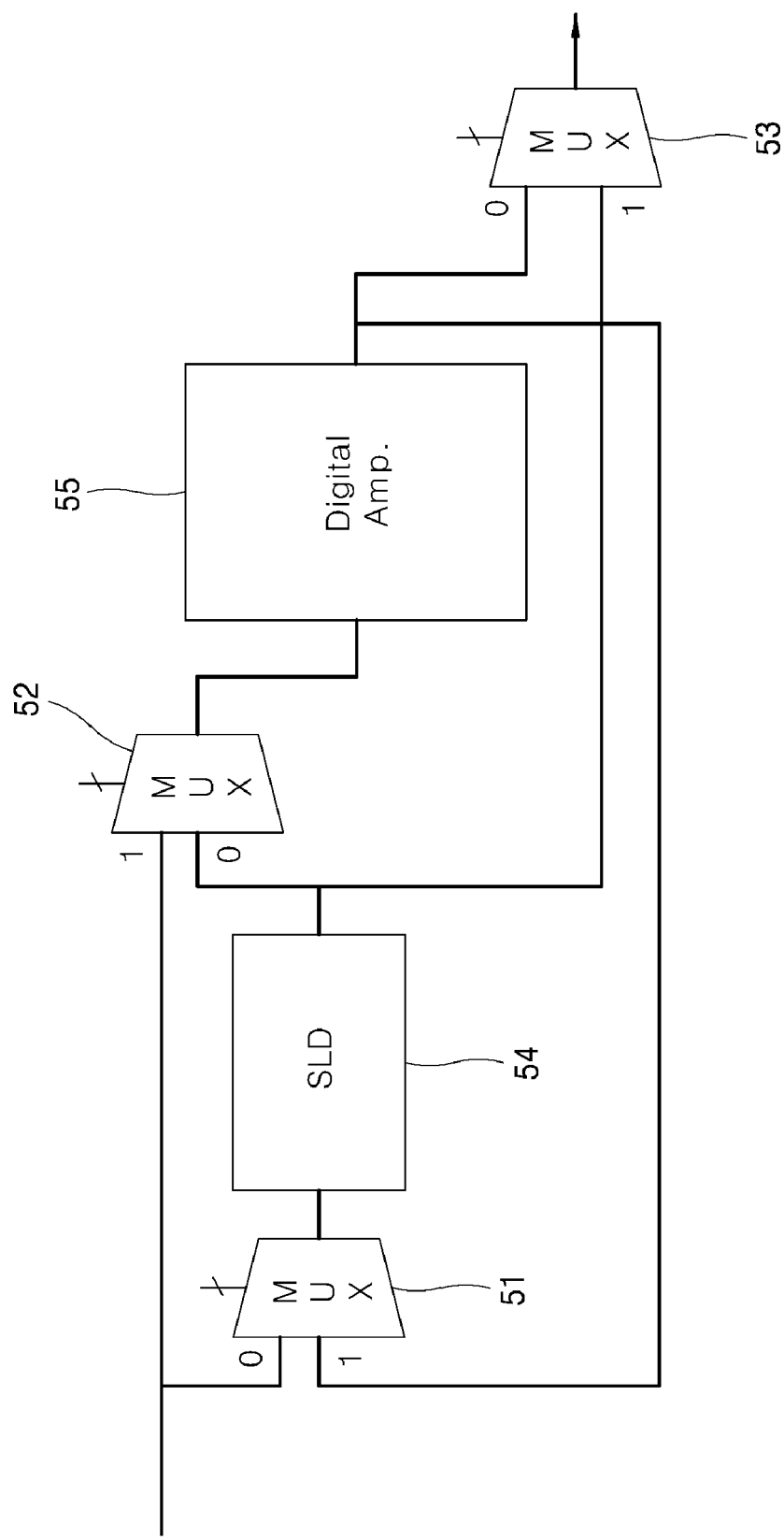
FIG. 5 is a circuit diagram of a reflection signal conversion circuit according to an embodiment.

FIG. 5 is a circuit diagram of a reflection signal conversion circuit according to an embodiment.

Referring to FIG. 5, the reflection signal converter 36 of the present embodiment may amplify a first reflection signal 501 according to the predetermined amplification ratio through three multiplexers (MUXes) 51, 52, and 53 and then remove noise of an amplified first reflection signal, or remove the noise of the first reflection signal and then amplify the first reflection signal from which noise is removed, according to the predetermined amplification ratio.

In other words, the reflection signal converter 36 may determine an input order of the first reflection signal 501 with respect to a square law detector 54 and an amplifier 55 through the control of the three MUXes 51, 52, and 53.

For example, as the reflection signal converter 36 applies a control signal having a value "0" to each of the MUXes 51, 52, and 53, the first reflection signal 501 is first input to the square law detector 54 through the first MUX 51, a signal output from the square law detector 54 is input to the amplifier 55 through the second MUX 52, and a signal output from the amplifier 55 is input to the third MUX 53, thereby finally generating a converted first reflection signal 502.

Reversely, as the reflection signal converter 36 applies a control signal having a value "1" to each of the MUXes 51, 51, and 53, the first reflection signal 501 is first input to the amplifier 55 through the second MUX 52, a signal output from the amplifier 55 is input to the square law detector 54 through the first MUX 51, and a signal output from the square law detector 54 is input to the third MUX 53, thereby finally generating the converted first reflection signal 502.

As such, the ultrasonic sensor according to the present disclosure may use a signal conversion method corresponding to the detection range sectioned according to the predetermined reference voltage value, that is, a signal conversion method in which the application order of an amplification process and a noise removing process is different.

Accordingly, in the ultrasonic sensor according to the present disclosure, since the signal conversion method corresponding to the detection range is used, a degree of the improvement of position measurement accuracy and the extension of the object sensible distance may be appropriately controlled depending on the situation.

The present disclosure described above may be variously substituted, altered, and modified by those skilled in the art to which the present inventive concept pertains without departing from the scope and sprit of the present disclosure. Therefore, the present disclosure is not limited to the above-mentioned exemplary embodiments and the accompanying drawings.

What is claimed is:

1. An ultrasonic sensor control method which is executed by an ultrasonic sensor comprising a processor, the method comprising:
   outputting, by the processor, a first sensing signal;
   comparing, by the processor, a voltage value of a first reflection signal corresponding to the first sensing signal with a predetermined reference voltage value;
   determining, by the processor, a conversion method of the first reflection signal according to a voltage value comparison result;
   converting, by the processor, the first reflection signal according to the determined conversion method; and
   detecting, by the processor, an object by comparing the converted first reflection signal with a predetermined reference reflection signal,
   wherein the determining of the conversion method of the first reflection signal according to the voltage value comparison result comprises,
   when the voltage value of the first reflection signal is greater than or equal to the predetermined reference voltage value, removing noise of the first reflection signal and then amplifying the first reflection signal from which the noise is removed, according to a predetermined amplification ratio, and
   when the voltage value of the first reflection signal is less than the predetermined reference voltage value, amplifying the first reflection signal.

2. The method of claim 1,
   wherein when the voltage value of the first reflection signal is less than the predetermined reference voltage value, the amplifying the first reflection signal comprises amplifying the first reflection signal according to a predetermined amplification ratio and then removing noise of the amplified first reflection signal.

3. The method of claim 1, further comprising:
   receiving an input of a signal conversion method directly from a user; and
   converting the first reflection signal according to the received signal conversion method.

4. The method of claim 1, further comprising:
   outputting a second sensing signal;
   calculating an increase/decrease amount of the voltage value of a second reflection signal corresponding to the second sensing signal compared to the voltage value of the first reflection signal; and
   determining a conversion method of the second reflection signal according to the increase/decrease amount.

5. An ultrasonic sensor comprising a processor, the processor configured to:
   output a first sensing signal;
   compare a voltage value of a first reflection signal corresponding to the first sensing signal with a predetermined reference voltage value;
   determine a conversion method of the first reflection signal according to a comparison result of the voltage value, and convert the first reflection signal according to the determined conversion method; and
   detect an object by comparing the converted first reflection signal with a predetermined reference reflection signal,
   wherein, when the voltage value of the first reflection signal is greater than or equal to the predetermined reference voltage value, the processor removes noise of the first reflection signal and then amplifies the first reflection signal from which the noise is removed, according to a predetermined amplification ratio, and
   when the voltage value of the first reflection signal is less than the predetermined reference voltage value, the processor amplifies the first reflection signal.

6. The ultrasonic sensor of claim 5, wherein, when the voltage value of the first reflection signal is less than the predetermined reference voltage value, the processor amplifies the first reflection signal according to the predetermined amplification ratio and then removes noise of an amplified first reflection signal.

7. The ultrasonic sensor of claim 5, wherein the processor receives an input of a signal conversion method directly from a user and converts the first reflection signal according to the received signal conversion method.

8. The ultrasonic sensor of claim 5, wherein the processor outputs a second sensing signal, the processor calculates an increase/decrease amount of a second voltage value of the reflection signal corresponding to the second sensing signal compared to the voltage value of the first reflection signal, and determines a conversion method of the second reflection signal according to the increase/decrease amount.

* * * * *